(12) United States Patent
Küster

(10) Patent No.: US 11,913,426 B2
(45) Date of Patent: Feb. 27, 2024

(54) ROTOR BLADE FOR A WIND TURBINE AND WIND TURBINE

(71) Applicant: FLOWGEN DEVELOPMENT & MANAGEMENT AG, Zug (CH)

(72) Inventor: Dirk Küster, Sattel (CH)

(73) Assignee: FLOWGEN DEVELOPMENT & MANAGEMENT AG, Zug (CH)

( * ) Notice: Subject to any disclaimer, the term of this patent is extended or adjusted under 35 U.S.C. 154(b) by 142 days.

(21) Appl. No.: 17/625,937

(22) PCT Filed: Jul. 1, 2020

(86) PCT No.: PCT/EP2020/068506
§ 371 (c)(1),
(2) Date: May 17, 2022

(87) PCT Pub. No.: WO2021/004853
PCT Pub. Date: Jan. 14, 2021

(65) Prior Publication Data
US 2023/0160363 A1 May 25, 2023

(30) Foreign Application Priority Data
Jul. 11, 2019 (EP) ..................... 19185774

(51) Int. Cl.
*F03D 1/06* (2006.01)
*F03D 1/04* (2006.01)
(52) U.S. Cl.
CPC ............ *F03D 1/0641* (2013.01); *F03D 1/04* (2013.01); *F05B 2240/301* (2013.01); *F05B 2240/307* (2020.08); *F05B 2260/96* (2013.01)

(58) Field of Classification Search
CPC . F03D 1/0633; F03D 1/0634; F05B 2240/301
See application file for complete search history.

(56) References Cited

U.S. PATENT DOCUMENTS

2012/0057984 A1\* 3/2012 Fuglsang .............. F03D 1/0675
29/889.1

FOREIGN PATENT DOCUMENTS

| CN | 107366605 A | 11/2017 |
|----|-------------|---------|
| EP | 1019631 B1 | 12/2004 |
| EP | 2840255 A2 | 2/2015 |
| EP | 3147449 A1 | 3/2017 |
| EP | 3 330 530 A1 | 6/2018 |
| EP | 3473848 A1 | 4/2019 |
| NL | 1030111 C1 | 12/2005 |

(Continued)

OTHER PUBLICATIONS

Sep. 29, 2020 International Search Report issued in International Patent Application No. PCT/EP2020/068506.

(Continued)

*Primary Examiner* — Brian O Peters
(74) *Attorney, Agent, or Firm* — Oliff PLC

(57) ABSTRACT

A rotor blade for a wind turbine has a rotor blade root defining a reference plane for attachment to a hub. Adjacent to the rotor blade root is a profile region extending to the rotor blade tip. In the profile region, the rotor blade has a blade profile defining a chord. The chord angle between the reference plane and the chord increases over the entire profile region, from the rotor blade root towards the rotor blade tip.

13 Claims, 5 Drawing Sheets

(56) References Cited

FOREIGN PATENT DOCUMENTS

Figure 7:
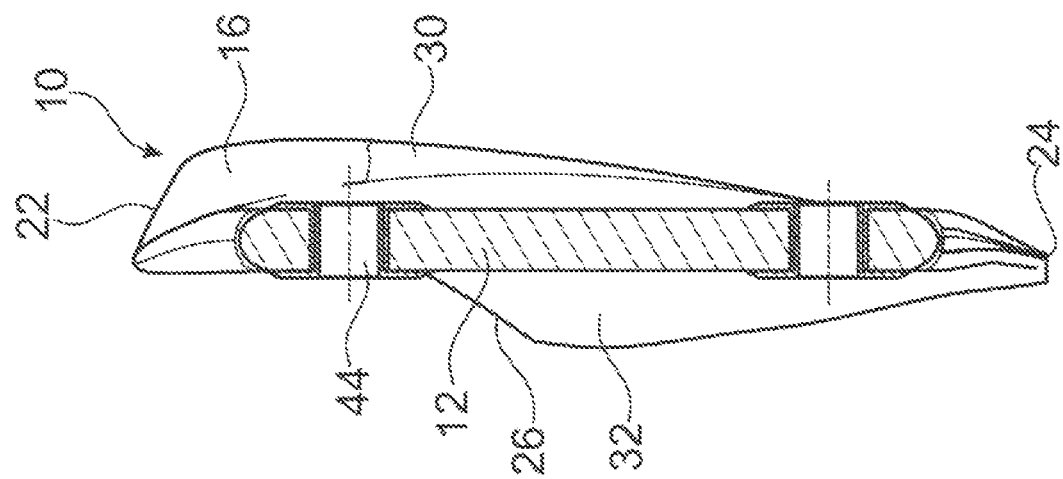

| WO | 92/01156 A1 | 1/1992 |
| WO | 2010/046000 A2 | 4/2010 |
| WO | 2018/046067 A1 | 3/2018 |
| WO | 2019/030205 A1 | 2/2019 |
| WO | 2019/076514 A1 | 4/2019 |

OTHER PUBLICATIONS

Akour et al., "Experimental and theoretical investigation of micro wind turbine for low wind speed regions," Renewable Energy, Feb. 2018, vol. 116, Part A, pp. 215-223.

* cited by examiner

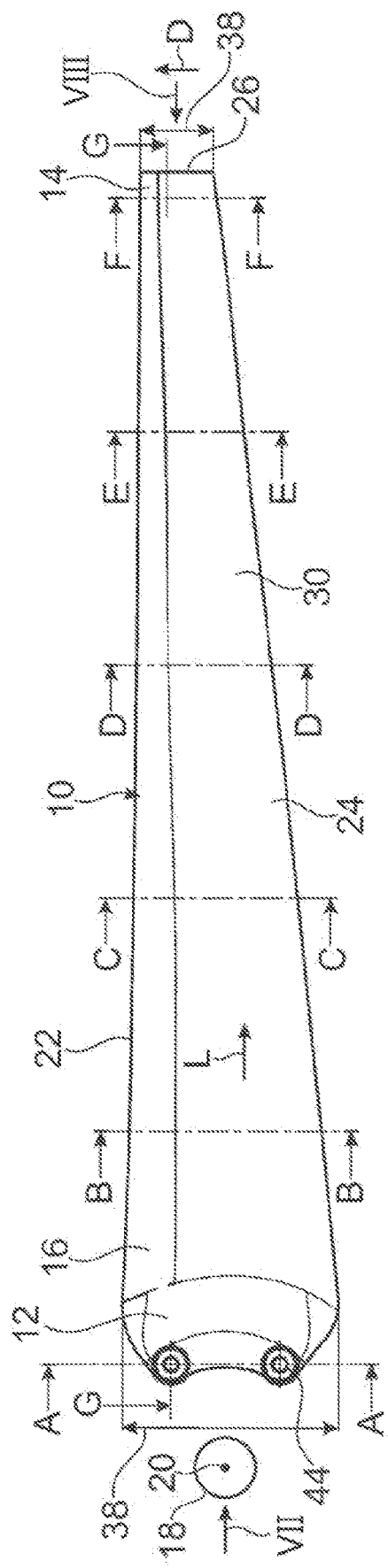

ROTOR BLADE FOR A WIND TURBINE AND WIND TURBINE

The present invention relates to a rotor blade for a wind turbine according to claim 1 and to a wind turbine according to claim 13.

Rotor blades of wind turbines and wind turbines with rotor blades are generally known and disclosed, for example, in the documents EP 3 330 530 A1, EP 3 147 499 A1, EP 2 840 255 A2, EP 1 019 631 B1, WO 2019/030205 A1, WO 2018/046067 A1, WO 2010/046000 A2 and NL 1030111.

In particular, the present invention relates to rotor blades of a wind turbine and to wind turbines having such rotor blades, which have a rotor diameter of 1.5 m to 8 m and a length of the rotor blade of about 0.75 m to about 4 m, respectively.

It is the object of the present invention to present a rotor blade of a wind turbine and a wind turbine with such rotor blades, which have a good starting behavior with low noise emissions.

This object is solved with a rotor blade according to claim 1 and a wind turbine according to claim 13.

In a known manner, a rotor blade of a wind turbine has a rotor blade root for fastening the rotor blade to a rotor shaft or to a hub. The rotor blade root defines a reference plane. The hub is typically attached to the rotor shaft. In operation, the rotor shaft or its axis of rotation is at least approximately aligned in the direction of the incoming wind.

A profile region of the rotor blade adjoins the rotor blade root and extends into a rotor blade tip region facing away from the rotor blade root. Preferably, the profile region extends to the rotor blade tip, i.e. to the free end of the rotor blade; however, it is also conceivable that the profile region ends at a distance from the rotor blade tip, in the rotor blade tip region, and the rotor blade has a rotor blade element of different shape following the profile region to the rotor blade tip.

A rotor blade nose and a rotor blade rear edge extend along the entire length of the profile region. A blade profile of the rotor blade, which extends over the entire profile region from the rotor blade nose to the rotor blade rear edge, has an upper side forming a suction side and a lower side forming a pressure side.

The upper side is on the leeward side and the lower side on the windward side.

A chord of the blade profile extends through the rotor blade nose and the rotor blade rear edge. The chord and the reference plane enclose a chord angle, wherein the lower side of the blade profile faces the reference plane and the upper side of the blade profile faces away from the reference plane.

The distance between the reference plane and the chord is increasing in the direction towards the rotor blade nose.

The reference plane BE encloses, in the assembled state of the rotor blade 10, with the rotor shaft 18 and thus its axis of rotation 20 an angle of attack $\beta$ of preferably maximum 70° and minimum 50°. This angle of attack $\beta$ is the smallest measurable angle between the axis of rotation 20 and the reference plane BE.

The lower side of the blade profile is designed to be impelled by the wind.

According to the invention, the chord angle increases over the profile region, from the rotor blade root towards the rotor blade tip region.

Experiments and computer simulations have shown that such a rotor blade and wind turbines with such rotor blades already show a good cp value at low wind speeds of, for example, 4.5 m to 5 m per second with low noise emissions and thus exhibit good start-up characteristics.

In a preferred manner, the chord angle increases continuously, especially preferably at least approximately linearly, resulting in a rotor blade with high efficiency and simple construction. This increase in chord angle occurs preferentially up to the rotor blade tip. However, the chord angle can also increase linearly from the rotor blade root to the rotor blade tip region and more strongly in the rotor blade tip region, which supports a good starting behavior at low wind speeds.

Preferably, the chord angle is between 0° and 4° in an initial section immediately adjacent to the rotor blade root and between 20° and 26° in the rotor blade tip region. This leads to good results for rotor blade lengths of approx. 0.75 m to approx. 4 m and thus rotor diameters of approx. 1.5 m to approx. 8 m.

Preferably, the chord angle at the rotor blade root-side end of the profile region is 0°.

Preferably, the rotor blade rear edge is at least approximately straight. This leads to a particularly simple design of the rotor blade.

The particularly simple structure and the good efficiency are supported if the rotor blade rear edge, as is preferred, runs at least approximately in the reference plane.

Preferably, the profile depth decreases over the entire profile region, from the rotor root towards the rotor blade tip region. This allows the mechanical stress on the rotor blade to be kept low.

Preferably, the profile depth decreases continuously, especially preferably linearly. This also leads to a particularly simple and efficient rotor blade.

Preferably, the profile depth, starting at the rotor blade root and extending into the rotor blade tip region, decreases to half to one quarter, preferably at least approximately to one third. This results in a rotor blade that is simple, stable and efficient in design.

Preferably, the profile thickness also decreases over the entire profile region, from the rotor blade root towards the rotor blade tip region. This is preferably continuous, in particular at least approximately linear. This allows the blade profile to have at least approximately the same shape throughout the profile region (it is similar), resulting in a particularly simple structure.

It has been shown that a preferably at least approximately constant ratio of profile thickness to profile depth over the entire profile region leads to an efficient rotor blade that is simple in structure. Preferably, this ratio is at least approximately 0.07.

Preferably, the ratio of the profile depth, measured at the rotor blade root-side end of the profile region, to the length of the profile region (measured in the longitudinal direction of the rotor blade) is at least approximately 0.2.

The rotor blade is designed to rotate about the axis of rotation of the wind turbine, the axis of rotation being oriented at least approximately in the direction of the incoming wind during operation, and the rotor blade, as preferred, being on the windward side. It can then be impelled by the wind undisturbed.

The blade profile is preferably a normal profile with a convex curved upper side and an S-shaped curved lower side, whereby on the lower side the transition from the convex to the concave shape is located close to the profile nose, preferably within the first 15% of the profile depth. This results in a slender blade profile.

A wind turbine equipped with such rotor blades has a rotor shaft defining an axis of rotation with a hub fixed thereon, to which the rotor blades are attached. During operation of the wind turbine, the axis of rotation is aligned at least approximately in the direction of the incoming wind and the rotor blades are located on the windward side for undisturbed inflow.

The wind turbine preferably has two to five, especially preferably three rotor blades. On the one hand, this ensures a symmetrical design and, on the other hand, smooth running.

Preferably, the wind turbine is designed in the form of a shrouded wind turbine to achieve a particularly good efficiency.

Preferably, the rotor blade is designed to extend with its longitudinal direction at least approximately in radial direction to the axis of rotation. The same applies to wind turbines with two or more rotor blades, whereby these are evenly distributed in the circumferential direction.

The rotor blade nose preferably extends at least approximately in a plane perpendicular to the reference plane.

It is also possible to arrange the rotor blade root on the hub or on the rotor shaft to be pivotable about a pivot axis running in the longitudinal direction of the rotor blade, this in particular in order to pivot the rotor blade into a neutral position when no driving force is to be generated, or to optimize the incident flow.

For the sake of completeness, it should be mentioned that in operation the rotor blade nose, in the direction of rotation of the rotor blade, is leading and the rotor blade rear edge is trailing. Preferably, the rotor blade root is provided with two fastening lugs for fastening to the hub or rotor shaft, respectively, the passage of which is at least approximately perpendicular to the reference plane.

Figure 8:
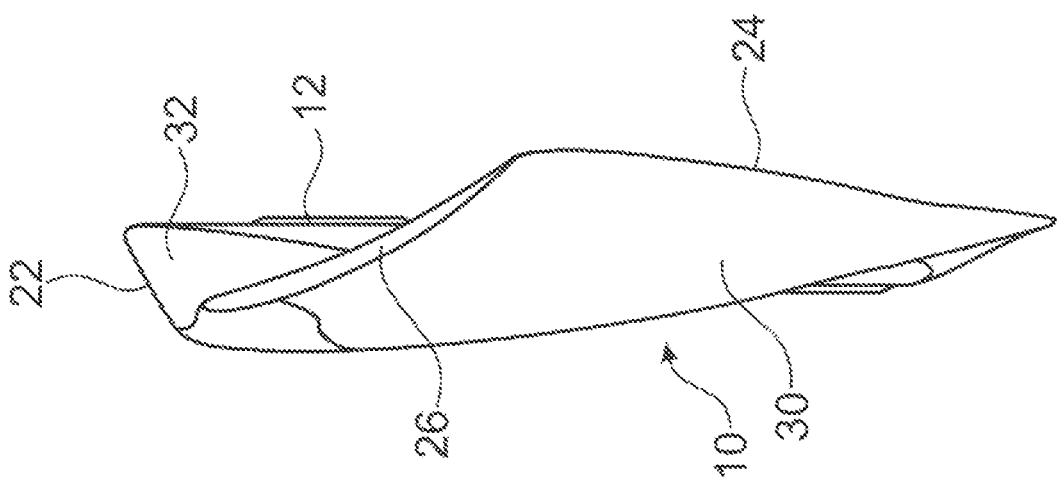
Figure 9:
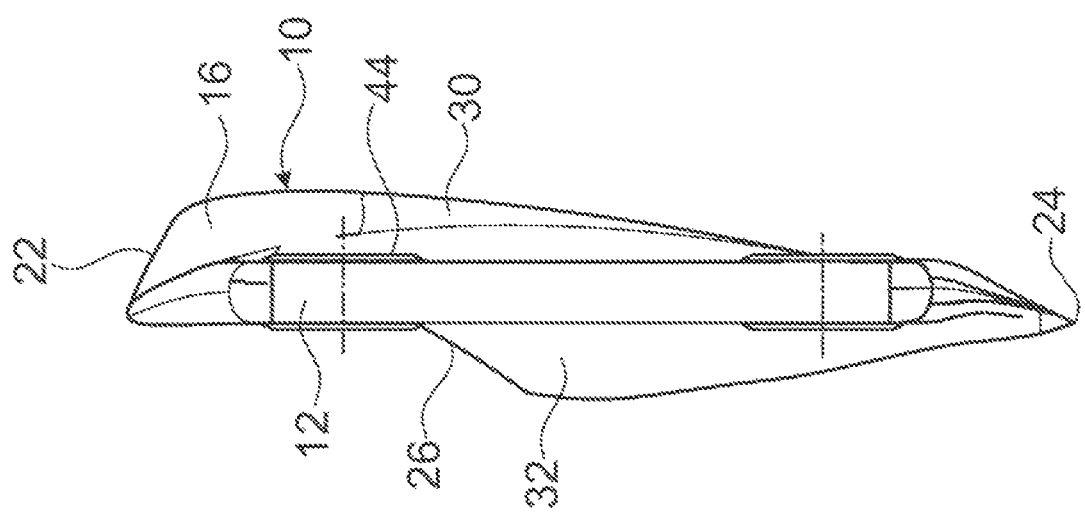
Figure 10:
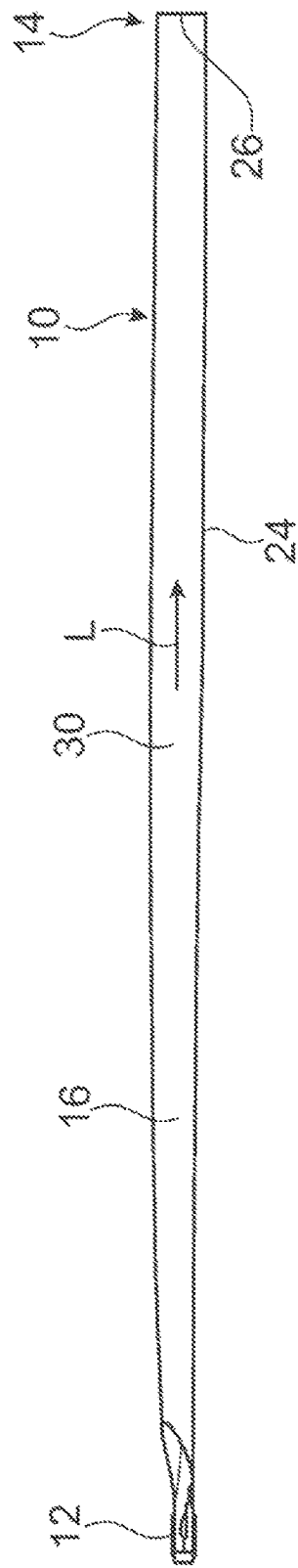
Figure 11:
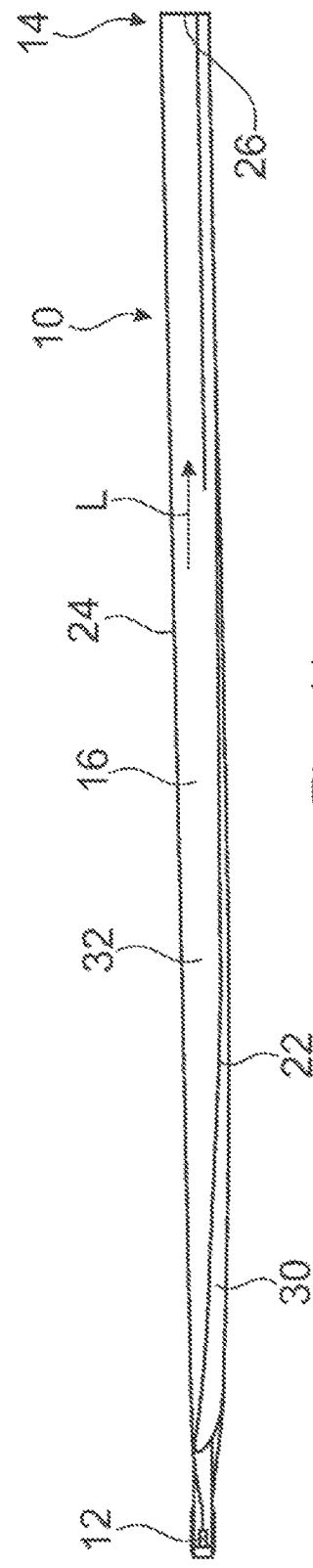
Figure 12:
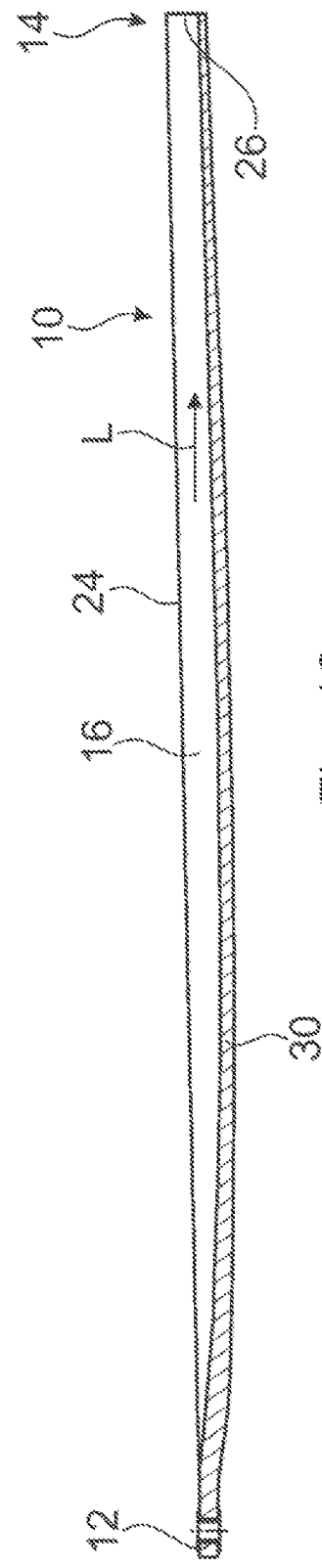
Figure 13:
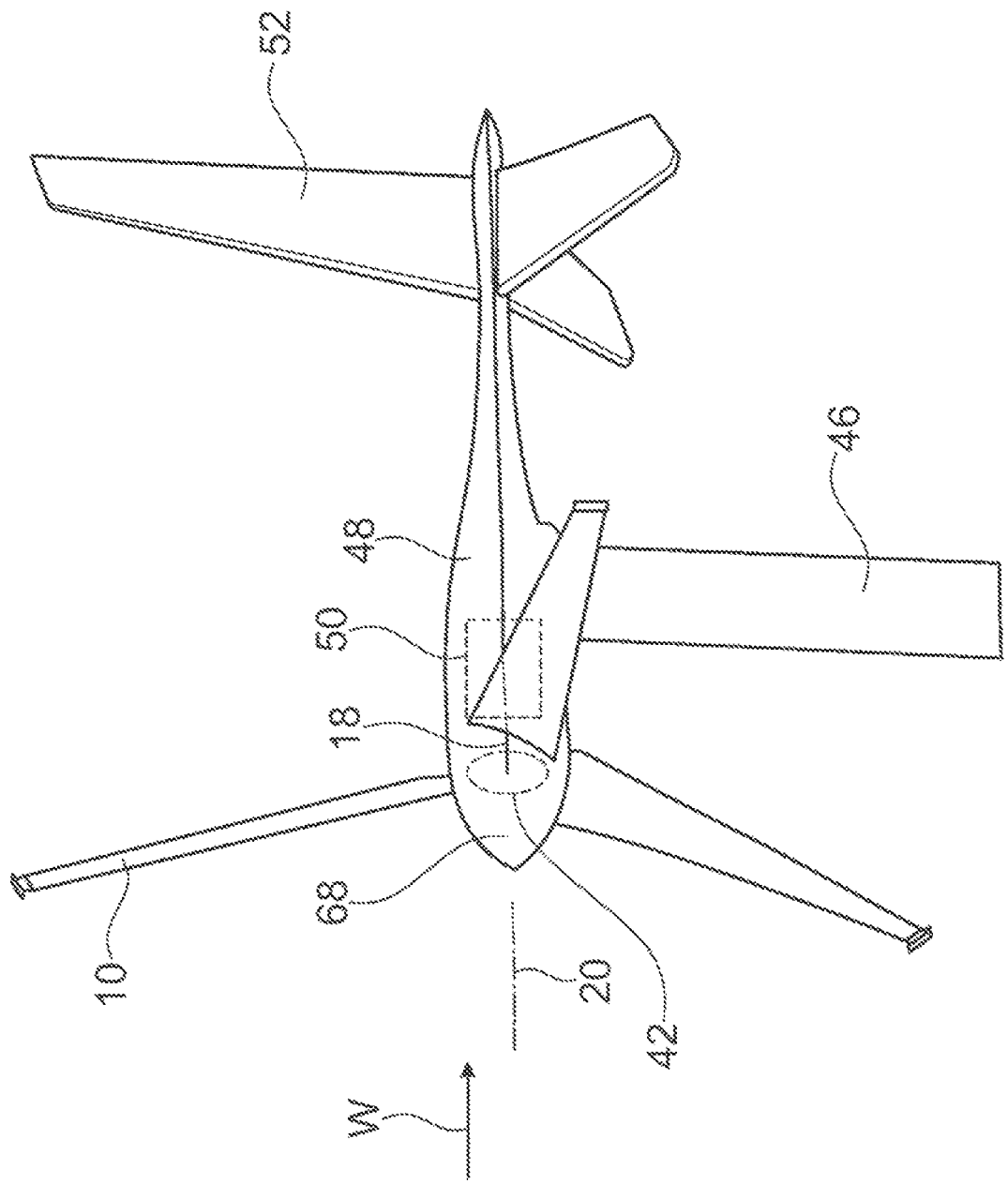
Figure 14:
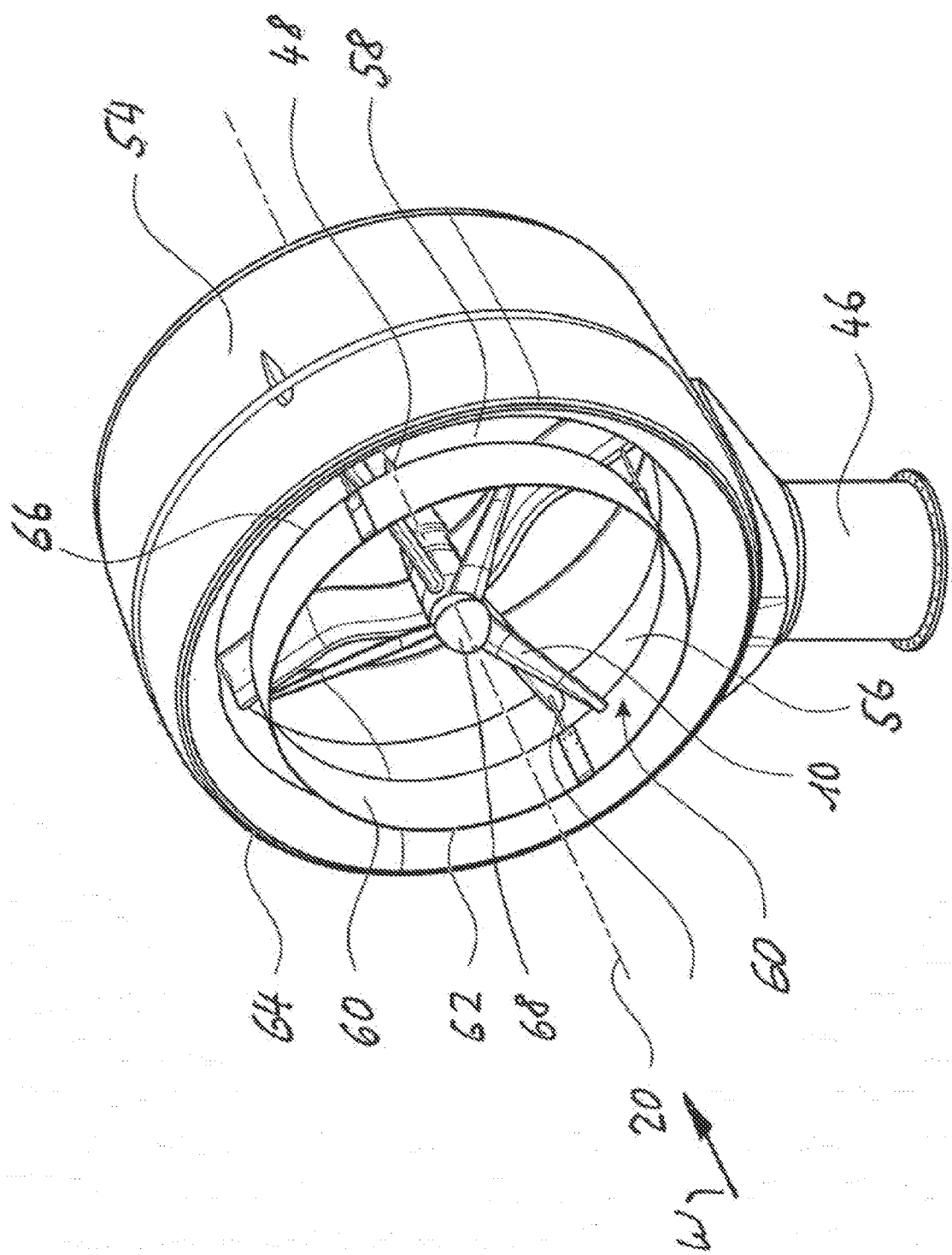

The invention is described in more detail with reference to the figures. They show, purely schematically:

FIG. 1 in view of a rotor blade according to the invention;

FIG. 2 a section through the rotor blade according to FIG. 1 along the line of intersection B-B;

FIG. 3 a section through the rotor blade according to FIG. 1 along the section line C-C;

FIG. 4 a section through the rotor blade according to FIG. 1 along the section line D-D;

FIG. 5 a section through the rotor blade according to FIG. 1 along the section line E-E;

FIG. 6 a section through the rotor blade according to FIG. 1 along the section line F-F;

FIG. 7 a side view of the rotor blade according to FIGS. 1 to 6 in the direction of arrow VII of FIG. 1;

FIG. 8 the rotor blade according to FIGS. 1 to 7 in side view in the direction of arrow VIII of FIG. 1;

FIG. 9 a section through the rotor blade along section line A-A of FIG. 1;

FIG. 10 a view from below of the rotor blade shown in FIGS. 1 to 9;

FIG. 11 a top view of the rotor blade shown in FIGS. 1 to 10;

FIG. 12 a longitudinal section through the rotor blade along the section line G-G of FIG. 1, which runs at right angles to an axis of rotation;

FIG. 13 a perspective view of a wind turbine with three rotor blades according to FIGS. 1 to 12; and FIG. 14 in perspective view of a wind turbine designed in the manner of a shrouded wind turbine with three rotor blades according to FIGS. 1 to 12.

The rotor blade 10 shown in FIGS. 1 to 12 has a rotor blade root 12 and a profile region 16 directly adjoining the rotor blade root 12 and extending into a rotor blade tip region 13 remote from the rotor blade root 12. The rotor blade 10 is designed to be fastened with the rotor blade root 12 to a hub or to be fastened to the hub. This hub is seated in a known manner in a rotationally fixed manner on a rotor shaft 18, which defines an axis of rotation 20 for the rotor blade 10. In this connection, further reference is made to FIGS. 13 and 14 and the relevant description below.

A leading rotor blade nose 22 in the direction of rotation D of the rotor blade 10 and a trailing rotor blade rear edge 24 extend over the entire profile region 16.

In the embodiment shown, the profile region 16 extends to the rotor blade tip 26, that is, to the free end of the rotor blade 10. However, it is conceivable that the profile region 16 extends only into the rotor blade tip region 14 and that the rotor blade 10 then has a rotor blade element of a different shape following the profile region 16 to the rotor blade tip 26.

In the profile region 16, the rotor blade 18 has a blade profile 28 which, in a known manner, forms a suction side with its upper side 30 and a pressure side with its lower side 32. The blade profile 28 extends from the rotor blade nose 22 to the rotor blade rear edge 24.

In FIG. 2, an arrow W indicates the direction of the wind flowing against the rotor blade during operation. Thus, the lower side 32 is on the windward side and the upper side 30 is on the leeward side.

The blade profile 28 has a chord 34 that passes through the rotor blade nose 22 and the rotor blade rear edge 24 and defines a chord angle $\alpha$. This chord angle $\alpha$ is defined by the (smallest) angle between the chord 34 and a reference plane BE.

In the embodiment example, the reference plane BE is defined by the planar surface of the rotor blade root 12. The reference plane E further extends in the longitudinal direction L of the rotor blade 10 extending radially with respect to the axis of rotation 20.

As can be seen from FIG. 2, the reference plane BE defines an angle of attack $\beta$ of minimum of 50° and maximum of 70° with the axis of rotation 20.

As can be seen in particular from FIGS. 2 to 6, the chord angle $\alpha$ increases continuously over the entire profile region 16, from the rotor blade root 20 in the direction of the rotor blade tip 26 up to the latter.

Usually, the rotor blade 10 attached to the rotor shaft 18 or a hub seated thereon is covered by a shaft hood 68 up to the beginning of the profile region 16 on this side, i.e. the rotor blade root 12, as shown in connection with FIGS. 13 and 14.

Immediately adjacent to the rotor blade root 12, the chord angle $\alpha$ is 0° in the embodiment example shown. However, it is also possible for this to be a few degrees of angle, up to 4° for example.

In the embodiment example shown, the chord angle at the rotor blade tip is about 26°. However, it can also be selected smaller or larger. In the rotor blade tip region 14, the chord angle $\alpha$ is preferably between 20° and 28°.

As can be seen in particular from FIGS. 2 to 6 in conjunction with FIG. 1, the chord angle $\alpha$ increases linearly from the rotor blade root 12 in the direction of the rotor blade tip 26.

In the view according to FIG. 1, the rotor blade nose 22 and the rotor blade rear edge 24 are straight. As a result of the change of the chord angle $\alpha$, the rotor blade nose 22, as can be seen in particular from FIGS. 7 to 12, runs slightly curved while the rotor blade rear edge 24 (compare FIG. 10) is located approximately in the reference plane BE over its entire length.

The profile depth 38, i.e. the distance between the rotor blade nose 22 and rotor blade rear edge 24, decreases continuously over the entire profile region 16, from the rotor blade root 12 in the direction of the rotor blade tip 26, linearly in the embodiment example shown.

At the rotor blade tip 26, in the embodiment example shown, the profile depth 38 is one third of the profile depth 38 at the rotor blade root 12 side end of the profile region 16.

The ratio of the profile depth 36 at the rotor blade root side end of the profile region 16 to the length of the profile region 36—i.e. the distance between the rotor blade root 12 and the rotor blade tip 26—is 0.2.

The profile thickness 40 also decreases continuously over the entire profile region 16 from the rotor blade root 12 to the rotor blade tip 26, linearly in the embodiment example shown.

The ratio of the profile thickness 40 to the profile depth 38 is approximately 0.07 over the entire profile region 16. Consequently, this is a very slender blade profile 28.

As can be seen in particular from FIGS. 2 to 6, the blade profile 28 shown is a normal profile with a convexly curved upper side 30 and an S-shaped curved lower side 32, where on the lower side 32 the transition from the convex to the concave region is close to the rotor blade nose 22; the distance from the rotor blade nose 22 is about 10% of the profile depth 38.

As this particularly can also be seen from FIGS. 13 and 14, the rotor blade 10 is designed to rotate about the axis of rotation 20 of the wind turbine, the axis of rotation being at least approximately in the direction of the incoming wind W and the rotor blade 10 being located upwind of the wind turbine.

The two wind turbines shown in FIGS. 13 and 14 are each equipped with three rotor blades 10 according to FIGS. 1 to 12 and as described above.

These rotor blades 10 are fastened to the hub 42 by means of two bolts which are not shown and which, as shown in particular in FIG. 9, each engage through a fastening lug 44 of the rotor blade root 12. The longitudinal direction of these fastening lugs 44 and thus of the bolts runs at right angles to the reference plane BE.

In the embodiment of the wind turbine shown in FIG. 13, a streamlined generator housing 48, in which a generator 50 for generating electrical energy is arranged, is seated on a vertical support 46. Attached to the hub 46, which sits on the rotor shaft 18 driving the generator 50, are the three rotor blades 10 evenly distributed in the circumferential direction. A tail assembly 52 is located at the leeward end of the generator housing 48 to align the generator housing 48 about the vertical axis of the vertical support 46 such that the axis of rotation 20 is aligned against the incoming wind 36. The rotor blade roots 12 are covered by the shaft hood 68.

The embodiment of the wind turbine shown in FIG. 14 is designed as a shrouded wind turbine as disclosed in document WO 2019/076514 A1, but the three rotor blades 10 are designed according to FIGS. 1 to 12.

Sitting on the vertical support 36, rotatable about the vertical axis, is a shroud 54 which is formed rotationally symmetrical to the axis of rotation 22 and has a wing-shaped cross-section. The inner upper surface 56 of the shroud delimits a flow channel 58 for the wind. A guiding element 60 is annular and formed rotationally symmetrical to the axis of rotation 20. The outer diameter of the guiding element 60 is smaller than the smallest clear width of the flow channel 58.

The guiding element profile nose 62 is located upstream with respect to the shroud profile nose 64 and the guiding element profile rear edge 66 is located downstream with respect to the shroud profile nose 64, but upstream with respect to the smallest clear width of the flow channel 58.

The propeller with the three rotor blades 10 for driving the electrical generator 50 is located at least approximately at the guiding element profile rear edge 66.

To align the shroud 54, and thus the axis of rotation 20, against the incoming wind 36, the shroud 54 is motor rotatable about the axis of the vertical support 46.

The present subject invention may also be defined as follows:

A rotor blade of a wind turbine having a rotor blade root 12 for attaching the rotor blade 10 to a hub, a profile region 16 adjoining the rotor blade root 12 and extending into a rotor blade tip region 14 remote from the rotor blade root 12, a rotor blade nose 22 and a rotor blade rear edge 24 extending over the entire profile region 16, an upper side 30 forming a suction side and a lower side 32 forming a pressure side of a blade profile 28 extending over the entire profile region 16 from the rotor blade nose 22 to the rotor blade rear edge 24, as well as a chord 34 of the blade profile 28 extending through the rotor blade nose 22 and the rotor blade rear edge 24, wherein a chord angle α between a reference plane BE and the chord 34 increases over the profile region 16, from the rotor blade root 12 towards the rotor blade tip region 14.

The reference plane BE extends in the longitudinal direction L of the rotor blade 10, and the chord 34 at the rotor blade root-side end of the profile region 16 extends at least approximately in it.

The upper side 30 of the blade profile 28 faces away from the reference plane BE and is located on the leeward side; correspondingly, the lower side 32 is located on the windward side.

The reference plane E encloses an angle of attack β between preferably 50° and 70° with the axis of rotation 20 and thus the incoming wind.

The invention claimed is:

1. A rotor blade for a wind turbine having a rotor blade root defining a reference plane for fastening the rotor blade to a hub, a profile region adjoining the rotor blade root and extending into a rotor blade tip region facing away from the rotor blade root, a rotor blade nose and a rotor blade rear edge, which extend over the entire profile region, and an upper side forming a suction side and a lower side forming a pressure side of a blade profile extending over the entire profile region from the rotor blade nose to the rotor blade rear edge, and a chord of the blade profile extending through the rotor blade nose and the rotor blade rear edge, wherein a chord angle between the reference plan and the chord increases over the profile region, from the rotor blade root in the direction of the rotor blade tip region, and the reference plane further extends in a longitudinal direction of the rotor blade extending radially with respect to an axis of rotation of the wind turbine.

2. The rotor blade according to claim 1, wherein the chord angle increases continuously.

3. The rotor blade according to claim 1, wherein the chord angle is between 0° and 4° in an initial section adjoining the rotor blade root and between 20° and 28° in the rotor blade tip region.

4. The rotor blade according to claim 1, wherein the rotor blade rear edge extends at least approximately rectilinearly.

5. The rotor blade according to claim 1, wherein the profile depth decreases over the entire profile region, from the rotor blade root towards the rotor blade tip region.

6. The rotor blade according to claim 5, wherein the profile depth decreases continuously.

7. Rotor blade according to claim 5, wherein the profile depth decreases to half to a quarter.

8. The rotor blade according to claim 1, wherein the profile thickness decreases over the entire profile region, from the rotor blade root towards the rotor blade tip region.

9. The rotor blade according to claim 8, wherein the profile thickness decreases continuously.

10. The rotor blade according to claim 8, wherein a ratio of profile thickness to profile depth is at least approximately constant in the entire profile region.

11. The rotor blade according to claim 1, wherein the rotor blade is designed to rotate about the axis of rotation of the wind turbine, the axis of rotation running at least approximately in the direction of the incoming wind, and the reference plane defining with the axis of rotation an angle of at least 50°.

12. The rotor blade according to claim 1, wherein the blade profile is a normal profile with a convexly curved upper side and an S-shaped curved lower side.

13. A wind turbine having a rotor shaft defining the axis of rotation and having a hub to which rotor blades according to claim 1 are attached by their rotor blade root, the axis of rotation being at least approximately aligned in the direction of the incoming wind during operation.

* * * * *